(12) United States Patent
Boek et al.

(10) Patent No.: US 11,052,481 B2
(45) Date of Patent: Jul. 6, 2021

(54) METHODS FOR LASER PROCESSING TRANSPARENT WORKPIECES USING PULSED LASER BEAM FOCAL LINES AND VAPOR ETCHING

(71) Applicant: CORNING INCORPORATED, Corning, NY (US)

(72) Inventors: Heather Debra Boek, Corning, NY (US); Andreas Simon Gaab, Grobenzell (DE); Garrett Andrew Piech, Corning, NY (US); Alranzo Boh Ruffin, Painted Post, NY (US); Daniel Arthur Sternquist, Horseheads, NY (US); Michael Brian Webb, Lindley, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/776,055

(22) Filed: Jan. 29, 2020

(65) Prior Publication Data

US 2020/0254557 A1     Aug. 13, 2020

Related U.S. Application Data

(60) Provisional application No. 62/802,905, filed on Feb. 8, 2019.

(51) Int. Cl.
*B23K 26/00* (2014.01)
*B23K 26/362* (2014.01)

(52) U.S. Cl.
CPC ........ *B23K 26/009* (2013.01); *B23K 26/0006* (2013.01); *B23K 26/362* (2013.01)

(58) Field of Classification Search
None
See application file for complete search history.

(56) References Cited

U.S. PATENT DOCUMENTS 9,278,886 B2 * 3/2016 Boek .................. B23K 26/389
9,517,963 B2   12/2016 Marjanovic et al.
(Continued)

FOREIGN PATENT DOCUMENTS

| WO | 2012/075072 A2 | 6/2012 |
| WO | 2018/049044 A1 | 3/2018 |
| WO | 2019079417 A2 | 4/2019 |

OTHER PUBLICATIONS

International Search Report and Written Opinion of the International Searching Authority; PCT/US2020/013690; dated May 12, 2020; 10 Pages; European Patent Office.
(Continued)

*Primary Examiner* — Roberts P Culbert
(74) *Attorney, Agent, or Firm* — Smit Kapadia

(57) ABSTRACT

A method for processing a transparent workpiece includes directing a pulsed laser beam into the transparent workpiece such that a portion of the pulsed laser beam directed into the transparent workpiece generates an induced absorption within the transparent workpiece, thereby forming a damage line within the transparent workpiece, and the portion of the pulsed laser beam directed into the transparent workpiece includes a wavelength $\lambda$, a spot size $w_0$, and a Rayleigh range $Z_R$ that is greater than $$F_D \frac{\pi w_0^2}{\lambda},$$

where $F_D$ is a dimensionless divergence factor comprising a value of 10 or greater. Further, the method for processing the transparent workpiece includes etching the transparent workpiece with an etching vapor to remove at least a portion of the transparent workpiece along the damage line, thereby (Continued)

forming an aperture extending through the at least a portion of the thickness of the transparent workpiece.

13 Claims, 10 Drawing Sheets

(56) References Cited

U.S. PATENT DOCUMENTS

| | | | |
|---|---|---|---|
| 9,573,843 B2 | 2/2017 | Keegan et al. | |
| 10,366,904 B2 | 7/2019 | Jaramillo et al. | |
| 10,522,963 B2 | 12/2019 | Comstock, II et al. | |
| 2017/0295652 A1* | 10/2017 | Isobe | H05K 1/0306 |
| 2018/0093914 A1 | 4/2018 | Akarapu et al. | |
| 2018/0339936 A1 | 11/2018 | Ono et al. | |

OTHER PUBLICATIONS

Primaxx® HF Vapor Release Etch; Dry HF Vapor Etch Processing for Removing Sacrifical Oxide Layers; 3 Pages; (2020).

Thiele; "Relation Between Catalytic Activity and Size of Particle"; Industrial and Enbineering Chemistry, 31, pp. 916920, (1939.

Venturini et al; "Micromanufacturing in Fused Silica Via Femtosecond Laser Irradiation Follows by Gas-Phase Chemical Etching"; Micromachines, 3, pp. 604-614 (2012.

Venturini et al; "Selective Iterative Etching of Fused Silica With Gaseous Hydrofluoric Acid" J. Phys. Chem. C, 114, pp. 18712-18716 (2010.

* cited by examiner

METHODS FOR LASER PROCESSING TRANSPARENT WORKPIECES USING PULSED LASER BEAM FOCAL LINES AND VAPOR ETCHING

This application claims the benefit of priority to U.S. Provisional Application Ser. No. 62/802,905 filed on Feb. 8, 2019, the content of which is relied upon and incorporated herein by reference in its entirety.

BACKGROUND

Field

The present specification generally relates to apparatuses and methods for forming vias in transparent workpieces, and more particularly, to forming vias in transparent workpieces using laser processing and vapor etching techniques.

Technical Background

Transparent workpieces need to be structured for various applications with openings for subsequent processing or for product functionality. Conventionally, lasers may be used to drill openings in the workpieces directly, but this process is slow and feature size is limited. Other conventional techniques may employ wet etching processes. However, the ability of the etchant to penetrate vias and/or apertures of small diameters may result in the vias and/or apertures having narrow waists rather than being cylindrical in shape.

Accordingly, a need exists for alternative methods for forming vias and/or apertures in transparent workpieces.

SUMMARY

According to various aspects, a method for processing a transparent workpiece includes directing a pulsed laser beam through an optical system and into the transparent workpiece such that a portion of the pulsed laser beam directed into the transparent workpiece generates an induced absorption within the transparent workpiece, thereby forming a damage line within the transparent workpiece that extends from a first surface of the transparent workpiece through at least a portion of a thickness of the transparent workpiece, the portion of the pulsed laser beam directed into the transparent workpiece includes a wavelength $\lambda$, a spot size $w_0$, and a Rayleigh range $Z_R$ that is greater than $$F_D \frac{\pi w_0^2}{\lambda},$$

where $F_D$ is a dimensionless divergence factor comprising a value of 10 or greater. Further, the method for processing the transparent workpiece includes etching the transparent workpiece with an etching vapor to remove at least a portion of the transparent workpiece along the damage line, thereby forming an aperture extending through the at least a portion of the transparent workpiece.

Another aspect includes the method of the previous aspect, wherein the aperture comprises an aperture diameter and the aperture diameter varies by less than or equal to 30% through the thickness of the transparent workpiece.

Another aspect includes the method of any one of the previous aspects, wherein the aperture diameter is less than about 20 μm.

Another aspect includes the method of any one of the previous aspects, wherein an aspect ratio of an average thickness of the glass substrate to an average diameter of the plurality of apertures is greater than or equal to 20:1.

According to various aspects, a method for processing a transparent workpiece includes directing a pulsed laser beam through an optical system and into the transparent workpiece such that a portion of the pulsed laser beam directed into the transparent workpiece generates an induced absorption within the transparent workpiece and producing a defect within the transparent workpiece, the portion of the pulsed laser beam directed into the transparent workpiece includes a wavelength $\lambda$, a spot size $w_0$, and a Rayleigh range $Z_R$ that is greater than $$F_D \frac{\pi w_0^2}{\lambda},$$

where $F_D$ is a dimensionless divergence factor comprising a value of 10 or greater. The method also includes translating the transparent workpiece and the pulsed laser beam relative to each other, thereby forming a plurality of damage lines extending from a first surface of the transparent workpiece to a second surface of the transparent workpiece through a thickness of the transparent workpiece. Further, the method for processing the transparent workpiece includes etching the transparent workpiece with an etching vapor to remove at least a portion of the transparent workpiece along each of the plurality of damage lines, thereby forming a plurality of apertures extending through the transparent workpiece. Each of the plurality of apertures has an average diameter of less than 20 μm and a taper of less than 30% along a length of each of the plurality of apertures through the thickness of the transparent workpiece.

Another aspect includes the method of any one of the previous aspects, wherein the aperture diameter is less than about 15 μm.

Another aspect includes the method of any one of the previous aspects, further comprising etching the transparent workpiece with a wet chemical etching solution to further increase the aperture diameter.

Another aspect includes the method of any one of the previous aspects, further comprising applying ultrasound to the wet chemical etching solution during the etching.

Another aspect includes the method of any one of the previous aspects, wherein the etching vapor comprises a dry HF vapor.

Another aspect includes the method of any one of the previous aspects, wherein an aspect ratio of the thickness of the transparent workpiece to the average diameter of the plurality of apertures is greater than or equal to 20:1 and less than or equal to 55:1.

Another aspect includes the method of any one of the previous aspects, wherein the material is a high purity fused silica (HPFS), a borosilicate glass, or a glass containing greater than or equal to 95 wt % silica.

Another aspect includes the method of any one of the previous aspects, wherein the etching the transparent workpiece is performed in the absence of an etching mask.

According to another aspect, a glass article includes a glass substrate having a first major surface and a second major surface opposite the first major surface and separated from the first major surface by an average thickness of greater than or equal to 50 μm and less than or equal to 1000 μm; and a plurality of apertures extending through the glass substrate from the first major surface to the second major surface. Each of the plurality of apertures has an average diameter of greater than or equal to 5 μm and less than or equal to 20 μm and an aspect ratio of the average thickness of the glass substrate to the average diameter of the plurality of apertures is greater than or equal to 20:1.

Another aspect includes the glass article of the previous aspect, wherein the aspect ratio is greater than or equal to 30:1.

Another aspect includes the glass article of one of the previous two aspects, wherein the aspect ratio is greater than or equal to 40:1.

Another aspect includes the glass article of any of the previous three aspects, wherein a difference between a diameter at the first major surface of each of the plurality of apertures and a diameter at a distance of half of the average thickness of the glass substrate from the first major surface of each of the plurality of apertures is less than or equal to 30%.

Another aspect includes the glass article of any of the previous four aspects, wherein the glass article comprises high purity fused silica.

Another aspect includes the glass article of any of the previous five aspects, wherein the glass article comprises borosilicate glass.

Another aspect includes the glass article of any of the previous six aspects, wherein the glass article comprises a glass having a silica content of greater than or equal to 95 mol %.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
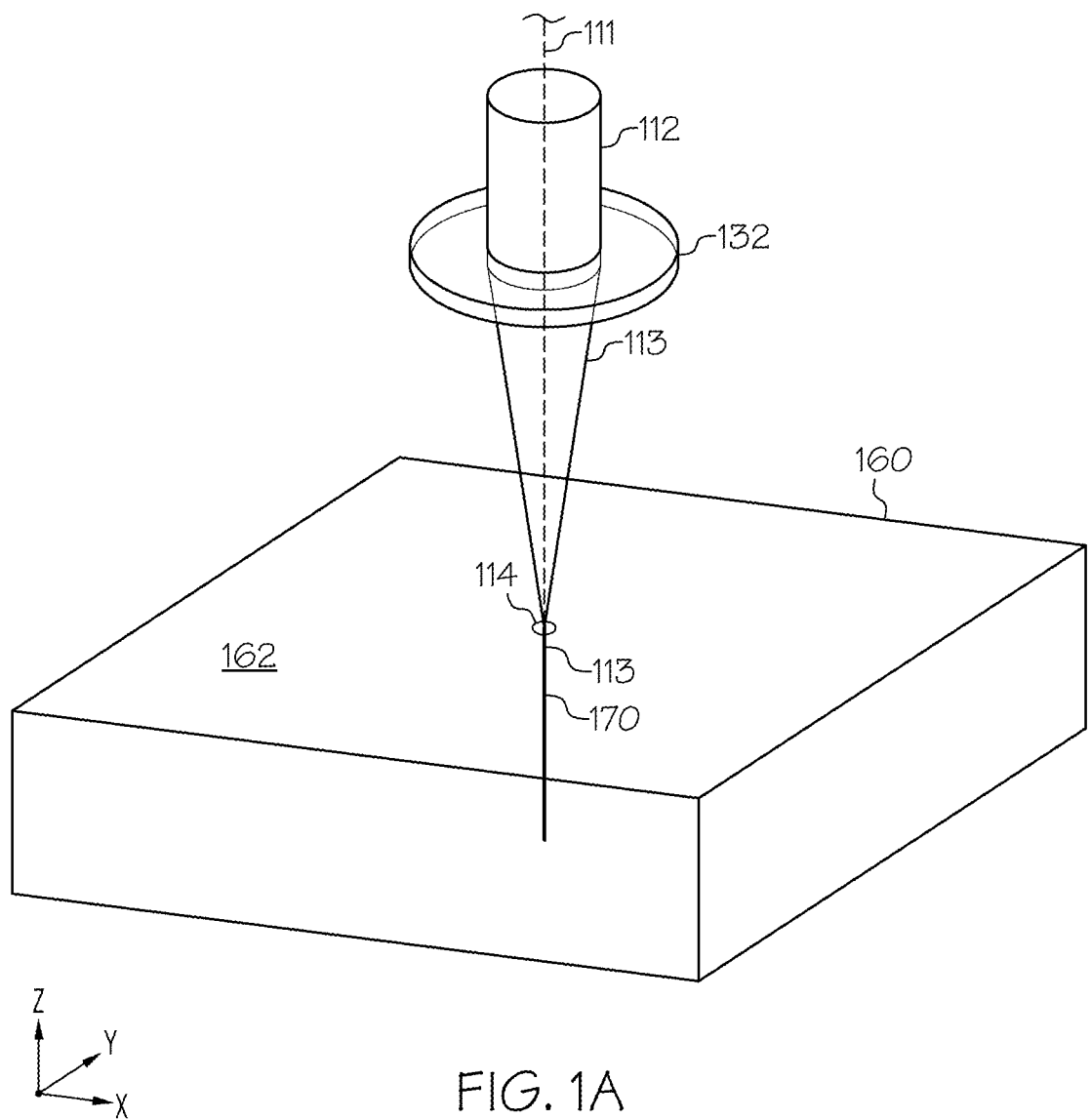
FIG. 1A schematically depicts the formation of a damage line, according to one or more embodiments described herein.

Reference will now be made in detail to embodiments of processes for laser processing transparent workpieces, such as glass workpieces, examples of which are illustrated in the accompanying drawings. Whenever possible, the same reference numerals will be used throughout the drawings to refer to the same or like parts. According to one or more embodiments described herein, a transparent workpiece may be laser processed to form a damage line can be vapor etched to form an aperture extending through a thickness of the transparent workpiece. According to one embodiment, a pulsed laser beam is directed through an aspheric optical element, such as an axicon, and into the transparent workpiece. The pulsed laser beam focal line may be utilized to create a series of defects in the transparent workpiece thereby forming a damage line that extends from a first surface of the transparent workpiece to a second surface of the transparent workpiece through a thickness of the transparent workpiece. These defects may be referred to herein as line defects, perforations, or nano-perforations in the workpiece. In various embodiments, the process further includes etching the transparent workpiece with an etching vapor to remove at least a portion of the transparent workpiece along the damage line, thereby forming an aperture extending through the transparent workpiece. Various embodiments of methods and apparatuses for processing a transparent workpiece will be described herein with specific reference to the appended drawings.

While the embodiments of processing a transparent workpiece to form one or more apertures extending through the transparent workpiece may be used in a variety of contexts, various embodiments are particularly useful for forming apertures in transparent workpieces that have a small diameter (e.g., less than 20 μm) and/or have a high aspect ratio of the thickness of the transparent workpiece to the average diameter of the plurality of apertures (e.g., greater than or equal to 20:1), and have very little taper of the hole/aperture along the depth of the substrate, defined as the difference between the maximum diameter of the aperture and the minimum diameter of the aperture (waist diameter). Moreover, in various embodiments, a diameter of the hole/aperture at a first surface of the transparent workpiece is within less than or equal to 2 μm of the diameter of the hole/aperture at a second surface of the transparent workpiece. Previous methods of forming apertures in transparent workpieces limited the achievable sizes and aspect ratios of these apertures, as well as being limited to creating apertures that have significant taper.

The phrase "transparent workpiece," as used herein, means a workpiece formed from a material which is transparent, where the term "transparent," as used herein, means that the material has an optical absorption of less than about 20% per mm of material depth, such as less than about 10% per mm of material depth for the specified pulsed laser wavelength, or such as less than about 1% per mm of material depth for the specified pulsed laser wavelength. According to one or more embodiments, the transparent workpiece may have a thickness of from about 50 microns (μm) to about 10 mm (such as from about 200 μm to about 500 μm, or from about 250 μm to about 400 μm, for example, 100 μm, 200 μm, 250 μm, 300 μm, 500 μm, or the like. Other thicknesses of the transparent workpiece are contemplated, including thicknesses of up to about 10 mm.

According to one or more embodiments, the present disclosure provides methods for processing workpieces. As used herein, "laser processing" may include forming damage lines in transparent workpieces. "Laser processing" may further include forming contour lines (e.g., closed contour lines), separating transparent workpieces, or combinations thereof. The transparent material may be comprised of a glass workpiece. According to some embodiments, the glass workpiece material is a high purity fused silica (HPFS). An example of such high purity fused silica would be Corning glass codes 7979, 7980, and 8655. Alternatively, the glass may be a borosilicate glass, containing primarily silicon dioxide ($SiO_2$) and boric oxide ($B_2O_3$), with less than 10 mol % other constituents. Examples of these borosilicate glasses are Borofloat™, BK7, and Corning glass codes 7070 and 7740. Alternatively, the glass may be a high silica content glass, containing greater than or equal to 95 wt % silica. Example of such high silica content glasses include Vycor™.

Without being bound by theory, glasses or glass-ceramics with high levels of volatile species will be vapor etched by hydrogen halogens such as hydrogen-chlorides, fluorides, bromides, and iodides. Components other than the etchable species remain as surface residue or corrosion products, with some that are water soluble so they can be rinsed off, or some that are not, so are not as easily removed from vias or channel, as will be described in greater detail below. Elements that are not volatile in vapor phase etching include alkalis (e.g., Li, Na, K, Rb, and Cs), while they are water soluble. Elements that are neither volatile nor water soluble include alkaline earths (e.g., Mg, Ca, Sr, and Ba) and rare earth elements (e.g., Ce, Pr, Nd, Eu, Gd, Er, and Yb).

In various embodiments, glasses or glass-ceramics contain volatile components with the etchant. In fluorides, for example, $B_2O_3$ and $SiO_2$ are most volatile, whereas the alkalis, alkaline earths and rare earth elements (REE) are not. To optimize the etching and avoid surface residue and corrosion products, therefore, the sum of ($B_2O_3+SiO_2$) is maximized in various embodiments, for example, being at least greater than or equal to 80 wt %. Examples of these borosilicate glasses include Schott Borofloat™ and BK7, and Corning glass codes 7740 and 7070. With the more preferred 95 wt % or greater, examples include high silica glasses Corning glass codes 7979, 7980, and 8655.

In etchants other than HF, for example HF, HCl, HBr, and HI, other elements in addition to B and Si are volatile, for example Sb, As, Sn, Se, Te, and S. This expands the realm of possible materials.

In various embodiments, the transparent workpiece includes glass or glass-ceramics with a maximum of volatile species in hydrogen halogens (HF, HCl, HBr, HI), for example silicates with ($B_2O_3+SiO_2$) greater than or equal to 80 wt %, greater than or equal to 85 wt %, greater than or equal to 90 wt %, or greater than or equal to 95 wt %, with a minimum of non-volatile species (e.g., less than or equal to 20 wt %, less than or equal to 15 wt %, less than or equal to 10 wt %, or less than or equal to 5 wt %). In some such embodiments, the non-volatile species may be water-soluble for easier removal of the surface residue or corrosion products.

In some embodiments, such as in the case of HPFS the glass material will have a coefficient of thermal expansion (CTE) of between 0.4-0.6 ppm/° C. over a temperature range of 100° C. to 200° C. For the borosilicate glasses, the CTE will typically be between 3-5 ppm/° C., but may preferably be chosen to be between 3-4 ppm/° C. over a temperature range of 20° C. to 300° C. for those electronics application which require more closely matching the coefficient of thermal expansion of silicon. For the high silica content glasses, the CTE may fall between 0.5-1.0 ppm/° C. over a temperature range from 0 to 300° C.

The phrase "damage line," as used herein, denotes a line formed from a plurality of defects within the transparent workpiece that extend from a first surface of the transparent workpiece to a second surface of the transparent workpiece through a thickness of the transparent workpiece.

The phrase "closed contour line," as used herein, denotes a line (e.g., a line, a curve, etc.) formed along a closed contour that extends along the surface of a transparent workpiece. The closed contour defines a desired feature perimeter along which material of the transparent workpiece may be removed to form one or more features extending through the transparent workpiece upon exposure to the appropriate processing conditions. The closed contour line generally consists of one or more defects introduced into the transparent workpiece using various techniques.

As used herein, a "defect" may include an area of modified material (relative to the bulk material), void space, scratch, flaw, hole, or other deformities in the transparent workpiece which may enable creation of an opening or hole through substrate, or separation of material of the transparent workpiece along the closed contour line, by application of a chemical etching solution to the transparent workpiece. While not intending to be limited by theory, the etching vapor may remove material of the transparent workpiece at and immediately surrounding each defect (and thus, each damage line), thereby enlarging each defect into a void, opening, or through hole. In embodiments in which damage lines form closed contour lines, the defects are enlarged such that voids formed from adjacent defects overlap, ultimately leading to separation of the transparent workpiece along the closed contour line and formation of the feature extending through the transparent workpiece.

Figure 1B:
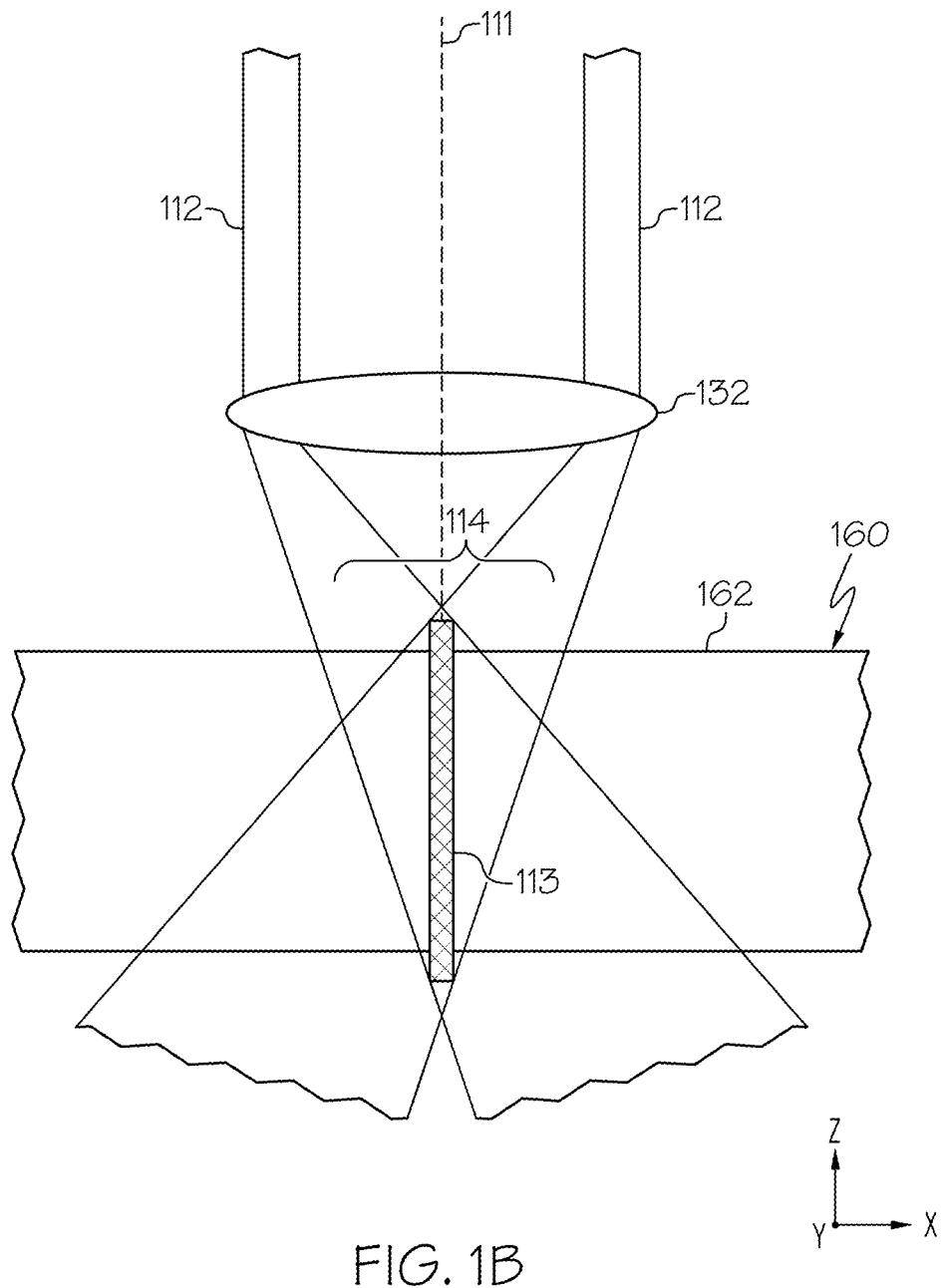
FIG. 1B schematically depicts an example pulsed laser beam focal line during processing of a transparent workpiece, according to one or more embodiments described herein.

Referring now to FIGS. 1A and 1B by way of example, a transparent workpiece 160, such as a glass workpiece or a glass-ceramic workpiece, is schematically depicted undergoing processing according to the methods described herein. FIGS. 1A and 1B depict the formation of a damage line 170 in the transparent workpiece 160. FIGS. 1A and 1B depict the pulsed laser beam 112 along a beam pathway 111 and oriented such that the pulsed laser beam 112 may be focused into a pulsed laser beam focal line 113 within the transparent workpiece 160 using an aspheric optical element 120 (FIG. 2), for example, an axicon and one or more lenses (e.g., a first lens 130 and a second lens 132, as described below and depicted in FIG. 2). Further, the pulsed laser beam focal line 113 is a portion of a quasi non-diffracting beam, as defined in more detail below.

FIGS. 1A and 1B depict that the pulsed laser beam 112 forms a beam spot 114 projected onto an imaging surface 162 of the transparent workpiece 160. As used herein the "imaging surface" 162 of the transparent workpiece 160 is the surface of the transparent workpiece 160 at which the pulsed laser beam 112 initially contacts the transparent workpiece 160. As also used herein "beam spot" refers to a cross section of a laser beam (e.g., the pulsed laser beam 112) at a point of first contact with a workpiece (e.g., the transparent workpiece 160). In some embodiments, the pulsed laser beam focal line 113 may comprise an axisymmetric cross section in a direction normal the beam pathway 111 (e.g., an axisymmetric beam spot) and in other embodiments, the pulsed laser beam focal line 113 may comprise a non-axisymmetric cross section in a direction normal the beam pathway 111 (e.g., a non-axisymmetric beam spot). As used herein, axisymmetric refers to a shape that is symmetric, or appears the same, for any arbitrary rotation angle made about a central axis, and "non-axisymmetric" refers to a shape that is not symmetric for any arbitrary rotation angle made about a central axis. A circular beam spot is an example of an axisymmetric beam spot and an elliptical beam spot is an example of a non-axisymmetric beam spot. The rotation axis (e.g., the central axis) is most often taken as being the propagation axis of the laser beam (e.g., the beam pathway 111). Example pulsed laser beams comprising a non-axisymmetric beam cross section are described in more detail in U.S. Provisional Pat. App. No. 62/402,337, titled "Apparatus and Methods for Laser Processing Transparent Workpieces Using Non-Axisymmetric Beam Spots," herein incorporated by reference in its entirety.

The damage line 170 comprises a plurality of defects that extend into the surface of the transparent workpiece 160 and establish a location or path for later preferential removal of material of the transparent workpiece 160 thereby forming an aperture 180 (FIG. 4) extending through the transparent workpiece 160, for example, by applying an etching vapor 302 (FIG. 3) to the transparent workpiece 160, at least along the damage line 170.

Figure 5:
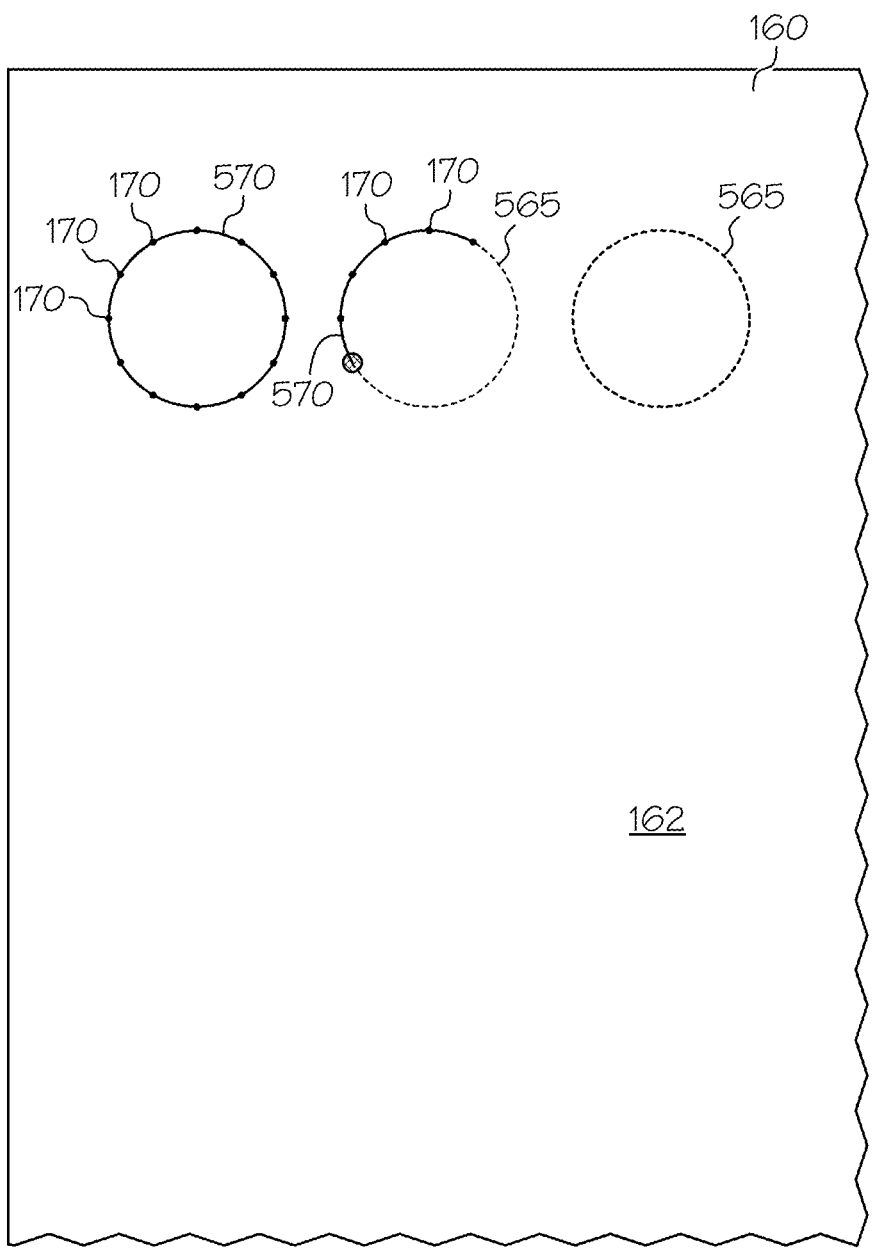
FIG. 5 schematically depicts a closed contour to form a closed contour line of defects in a transparent workpiece, according to one or more embodiments described herein.

While a single damage line 170 is depicted in FIG. 1A, it should be understood in various embodiments, a plurality of damage lines 170 may be spaced closely together to form a closed contour line in the any one of a number of closed configurations including, without limitation, circles, ellipses, squares, hexagons, ovals, regular geometric shapes, irregular shapes, polygonal shapes, arbitrary shapes, and the like, such as is shown in FIG. 5. In such a case the distance between adjacent damage lines 170 should be close enough for the subsequent etching step to result in merging of the etched features. The spacing or pitch between adjacent laser damage lines or sites 170 may be, for example, between 1-200 microns, but is more preferably between 5-50 microns, such as 10-20 microns.

Referring to FIGS. 1A and 1B, in the embodiments described herein, a pulsed laser beam 112 (with a beam spot 114 projected onto the transparent workpiece 160) may be directed onto the transparent workpiece 160 (e.g., condensed into a high aspect ratio line focus that penetrates through at least a portion of the thickness of the transparent workpiece 160). This forms the pulsed laser beam focal line 113. Further, the beam spot 114 is an example cross section of the pulsed laser beam focal line 113 and when the pulsed laser beam focal line 113 irradiates the transparent workpiece 160 (forming the beam spot 114), the pulsed laser beam focal line 113 penetrates at least a portion of the transparent workpiece 160.

Further, the pulsed laser beam 112 may be translated relative to the transparent workpiece 160 to form a plurality of damage lines. Directing or localizing the pulsed laser beam 112 into the transparent workpiece 160 generates an induced absorption within the transparent workpiece 160 and deposits enough energy to break chemical bonds in the transparent workpiece 160 at spaced locations to form the plurality of damage lines. According to one or more embodiments, the pulsed laser beam 112 may be translated across the transparent workpiece 160 by motion of the transparent workpiece 160 (e.g., motion of a translation stage 190 coupled to the transparent workpiece 160), motion of the pulsed laser beam 112 (e.g., motion of the pulsed laser beam focal line 113), or motion of both the transparent workpiece 160 and the pulsed laser beam focal line 113. By translating the pulsed laser beam focal line 113 relative to the transparent workpiece 160, the plurality of defects may be formed in the transparent workpiece 160.

Referring again to FIGS. 1A and 1B, the pulsed laser beam 112 used to form the defects further has an intensity distribution $I(X,Y,Z)$, where Z is the beam propagation direction of the pulsed laser beam 112, and X and Y are directions orthogonal to the direction of propagation, as depicted in the figures. The X-direction and Y-direction may also be referred to as cross-sectional directions and the X-Y plane may be referred to as a cross-sectional plane. The intensity distribution of the pulsed laser beam 112 in a cross-sectional plane may be referred to as a cross-sectional intensity distribution.

The pulsed laser beam 112 at the beam spot 114 or other cross sections may comprise a quasi-non-diffracting beam, for example, a beam having low beam divergence as mathematically defined below, by propagating the pulsed laser beam 112 (e.g., outputting the pulsed laser beam 112, such as a Gaussian beam, using a beam source 110) through an aspheric optical element 120, as described in more detail below with respect to the optical assembly 100 depicted in FIG. 2. Beam divergence refers to the rate of enlargement of the beam cross section in the direction of beam propagation (i.e., the Z direction). As used herein, the phrase "beam cross section" refers to the cross section of the pulsed laser beam 112 along a plane perpendicular to the beam propagation direction of the pulsed laser beam 112, for example, along the X-Y plane. One example beam cross section discussed herein is the beam spot 114 of the pulsed laser beam 112 projected onto the transparent workpiece 160. Example quasi non-diffracting beams include Gauss-Bessel beams and Bessel beams.

As stated above, the length of the quasi-non-diffracting beam 122C is determined by its Rayleigh range. Particularly, the quasi-non-diffracting beam 122C defines a laser beam focal line 113 having a first end point and a second end point each defined by locations where the quasi-non-diffracting beam has propagated a distance from the beam waist equal to a Rayleigh range of the quasi-non-diffracting beam. A detailed description of the formation of quasi-non-diffracting beams and determining their length, including a generalization of the description of such beams to asymmetric (such as non-axisymmetric) beam cross sectional profiles, is provided in U.S. Provisional Application Ser. No. 62/402,337 and Dutch Patent Application No. 2017998, which are incorporated by reference in their entireties.

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross sectional area of the laser beam. The Rayleigh range can also be observed as the distance along the beam axis at which the peak optical intensity observed in a cross sectional profile of the beam decays to one half of its value observed in a cross sectional profile of the beam at the beam waist location (location of maximum intensity). The quasi-non-diffracting beam defines a laser beam focal line having a first end point and a second end point. The first and second end points of a quasi-non-diffracting beam are defined as the locations where the quasi-non-diffracting beam has propagated a distance from the beam waist equal to a Rayleigh range of the quasi-non-diffracting beam. Laser beams with large Rayleigh ranges have low divergence and expand more slowly with distance in the beam propagation direction than laser beams with small Rayleigh ranges.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value. The maximum intensity of a Gaussian beam occurs at the center (x=0 and y=0 (Cartesian) or r=0 (cylindrical)) of the intensity distribution and radial extent used to determine spot size is measured relative to the center.

Beams with Gaussian intensity profiles may be less preferred for laser processing to form damage tracks because, when focused to small enough spot sizes (such as spot sizes in the range of microns, such as about 1-5 μm or about 1-10 μm) to enable available laser pulse energies to modify materials such as glass, they are highly diffracting and diverge significantly over short propagation distances. To achieve low divergence, it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

Non-diffracting or quasi-non-diffracting beams generally have complicated intensity profiles, such as those that decrease non-monotonically vs. radius. By analogy to a Gaussian beam, an effective spot size $w_{0,eff}$ can be defined for any beam, even non-axisymmetric beams, as the shortest radial distance, in any direction, from the radial position of the maximum intensity (r=0) at which the intensity decreases to $1/e^2$ of the maximum intensity. Further, for axisymmetric beams $w_{0,eff}$ is the radial distance from the radial position of the maximum intensity (r=0) at which the intensity decreases to $1/e^2$ of the maximum intensity. A criterion for Rayleigh range based on the effective spot size $w_{0,eff}$ for axisymmetric beams can be specified as non-diffracting or quasi-non-diffracting beams for forming damage regions in Equation (1), below:

$$Z_R > F_D \frac{\pi w_{0,eff}^2}{\lambda} \quad (1)$$

where $F_D$ is a dimensionless divergence factor having a value of at least 10, at least 50, at least 100, at least 250, at least 500, at least 1000, in the range from 10 to 2000, in the range from 50 to 1500, in the range from 100 to 1000. For a non-diffracting or quasi-non-diffracting beam the distance, $Z_R$ in Equation (1), over which the effective beam size doubles, is $F_D$ times the distance expected if a typical Gaussian beam profile were used. The dimensionless divergence factor $F_D$ provides a criterion for determining whether or not a laser beam is quasi-non-diffracting. As used herein, the pulsed laser beam 112 is considered quasi-non-diffracting if the characteristics of the laser beam satisfy Equation (1) with a value of $F_D \geq 10$. As the value of $F_D$ increases, the pulsed laser beam 122 approaches a more nearly perfectly non-diffracting state.

Figure 2:
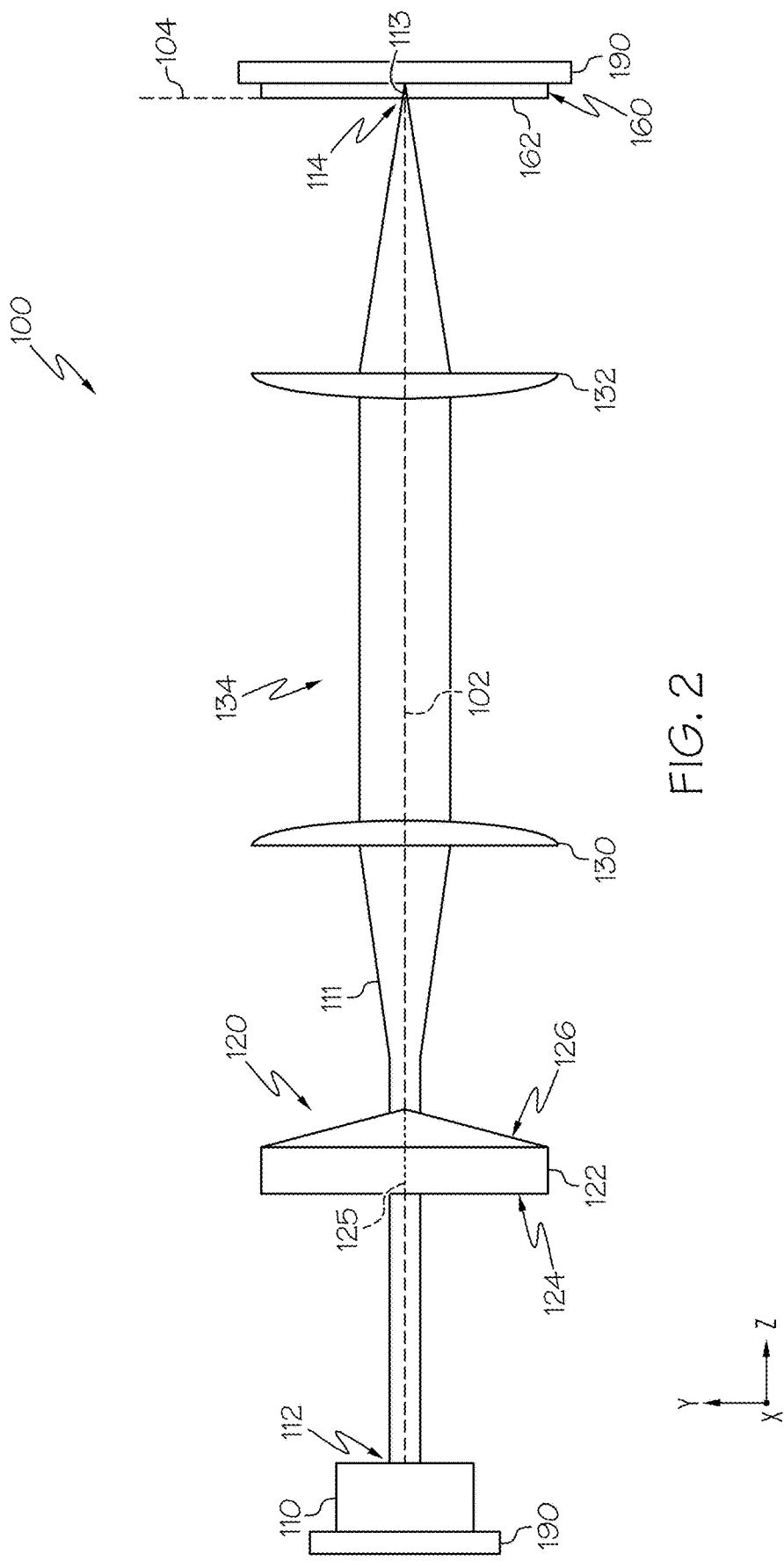
FIG. 2 schematically depicts an optical assembly for pulsed laser processing, according to one or more embodiments described herein.

Referring now to FIG. 2, an optical assembly 100 for producing a pulsed laser beam 112 that that is quasi-non-diffracting and forms the pulsed laser beam focal line 113 at the transparent workpiece 160 using the aspheric optical element 120 (e.g., an axicon 122) is schematically depicted. The optical assembly 100 includes a beam source 110 that outputs the pulsed laser beam 112, and a first and second lens 130, 132.

Further, the transparent workpiece 160 may be positioned such that the pulsed laser beam 112 output by the beam source 110 irradiates the transparent workpiece 160, for example, after traversing the aspheric optical element 120 and thereafter, both the first lens 130 and the second lens 132. An optical axis 102 extends between the beam source 110 and the transparent workpiece 160 along the Z-axis such that when the beam source 110 outputs the pulsed laser beam 112, the beam pathway 111 of the pulsed laser beam 112 extends along the optical axis 102. As used herein "upstream" and "downstream" refer to the relative position of two locations or components along the beam pathway 111 with respect to the beam source 110. For example, a first component is upstream from a second component if the pulsed laser beam 112 traverses the first component before traversing the second component. Further, a first component is downstream from a second component if the pulsed laser beam 112 traverses the second component before traversing the first component.

The cross sectional profile of the example quasi-non-diffracting beam created by the optical system of FIG. 2, specifically the cross section of the focal line 113, can be described by a Bessel function, and hence such laser beams are frequently referred to as Bessel beams. In a non-limiting example, the quasi-non-diffracting beam has a wavelength of about 532 nm and a numerical aperture of about 0.29, which provides a core at the center of the Bessel beam having a diameter of about 1.2 μm. The intensity of the laser beam in this core spot can be maintained over lengths of hundreds of microns, which is much longer than the diffraction limited Rayleigh range of a typical Gaussian profile beam of equivalent spot size (i.e., only a few microns).

The consequence of the focal line created by the quasi-non-diffracting beam is that the entire depth of the glass piece may be exposed or modified with each laser pulse. This should be contrasted with the use of traditional Gaussian laser beams used for material modification for preferential etching, where diffraction limits the laser modification of a tightly focused (e.g. diameter of a few microns or less)

to a Rayleigh range on the order of microns or a few tens of microns. In the case of traditional Gaussian beams, multiple laser pulses must be used at the site of each desired via. This makes the traditional laser process slow, as often hundreds or even thousands of pulses are needed, with the pulse delivery rate is often limited not just by the available laser repetition rate but also by heating effects that prevent use of high pulse repetition rates. This generally limits those laser damage process to tens or possibly a couple of hundred via sites per second.

In contrast, the laser exposure with the quasi-non-diffracting beam completely exposes each desired via site during the duration of a single pulse or burst of pulses—which is typically less than a couple of hundred nanoseconds, and even can be order of magnitude shorter for single pulses. The speed of QNDB laser exposure is thus only limited by the stages and optical scanner that enable the laser beam to move accurately to the next desired via site, and can typically be done at rates approaching a few thousand vias/second.

Referring still to FIG. 2, the beam source 110 may comprise any known or yet to be developed beam source 110 configured to output pulsed laser beams 112. In operation, the defects of the damage line 170 (FIG. 1A) are produced by interaction of the transparent workpiece 160 with the pulsed laser beam 112 output by the beam source 110. In some embodiments, the beam source 110 may output a pulsed laser beam 112 comprising a wavelength of for example, 1064 nm, 1030 nm, 532 nm, 530 nm, 355 nm, 343 nm, or 266 nm, or 215 nm. Further, the pulsed laser beam 112 used to form the defects in the transparent workpiece 160 may be well suited for materials that are transparent to the selected pulsed laser wavelength.

Suitable laser wavelengths for forming defects are wavelengths at which the combined losses of linear absorption and scattering by the transparent workpiece 160 are sufficiently low. In embodiments, the combined losses due to linear absorption and scattering by the transparent workpiece 160 at the wavelength are less than 20%/mm, or less than 15%/mm, or less than 10%/mm, or less than 5%/mm, or less than 1%/mm, where the dimension "/mm" means per millimeter of distance within the transparent workpiece 160 in the beam propagation direction of the pulsed laser beam 112 (e.g., the Z direction). Representative wavelengths for many glass workpieces include fundamental and harmonic wavelengths of $Nd^{3+}$ (e.g. $Nd^{3+}$:YAG or $Nd^{3+}$:YVO$_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined linear absorption and scattering loss requirement for a given substrate material can also be used.

In operation, the pulsed laser beam 112 output by the beam source 110 may create multi-photon absorption (MPA) in the transparent workpiece 160. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

The step that creates the damage line 170 (FIG. 1A) may utilize the beam source 110 (e.g., an ultra-short pulse laser) in combination with the aspheric optical element 120, the first lens 130, and the second lens 132, to project the beam spot 114 on the transparent workpiece 160 and generate the pulsed laser beam focal line 113. The pulsed laser beam focal line 113 comprises a quasi non-diffracting beam, such as a Gauss-Bessel beam or Bessel beam, as defined above, and may fully perforate the transparent workpiece 160 to form defects in the transparent workpiece 160, which may form the damage line 170. In some embodiments, the pulse duration of the individual pulses is in a range of from about 1 femtosecond to about 200 picoseconds, such as from about 1 picosecond to about 100 picoseconds, 5 picoseconds to about 20 picoseconds, or the like, and the repetition rate of the individual pulses may be in a range from about 1 kHz to 4 MHz, such as in a range from about 10 kHz to about 3 MHz, or from about 10 kHz to about 650 kHz.

In various embodiments, a pulsed laser beam 112 capable of generating pulse bursts may be employed. Additional details on the use of burst sequences may be found in U.S. patent application Ser. No. 16/162,644, filed on Oct. 17, 2018, the entire contents of which is hereby incorporated by reference in its entirety.

Referring again to FIG. 2, the aspheric optical element 120 is positioned within the beam pathway 111 between the beam source 110 and the transparent workpiece 160. In operation, propagating the pulsed laser beam 112, e.g., an incoming Gaussian beam, through the aspheric optical element 120 may alter the pulsed laser beam 112 such that the portion of the pulsed laser beam 112 propagating beyond the aspheric optical element 120 is quasi-non-diffracting, as described above. The aspheric optical element 120 may comprise any optical element that imparts a non-spherical wavefront to the laser beam, such as lens comprising an aspherical shape. In some embodiments, the aspheric optical element 120 may comprise a conical wavefront producing optical element, such as an axicon lens, for example, a negative refractive axicon lens, a positive refractive axicon lens, a reflective axicon lens, a diffractive axicon lens, a programmable spatial light modulator axicon lens (e.g., a phase axicon), or the like.

It is noted that the pulsed laser beam 112 used to illuminate the aspheric optical element 120 need not have a Gaussian profile, and additionally one need not use an axicon as the aspheric optical element 120 to form the quasi-non-diffracting beam 122C. Thus, it is possible to form different energy distributions along the optical axis, where the intensity may take the form of a "top hat" profile, or other profile shape. This provides the ability to more uniformly distribute the energy through the depth of the transparent workpiece 160, or to tailor the energy distribution so that certain regions of the transparent workpiece 160 receive more or less energy than others in a deterministic manner. The creation of such optics, which may be referred to as "waxicons," is described in U.S. patent application Ser. No. 15/689,456, filed on Aug. 29, 2017, which is incorporated by reference herein in its entirety.

In some embodiments, when the aspheric optical element 120 comprises an axicon 122 (as depicted in FIG. 2), the axicon 122 may have a laser output surface 126 (e.g., conical surface) having an angle of about 1.2°, such as from about 0.5° to about 5°, or from about 1° to about 1.5°, or even from about 0.5° to about 20°, the angle measured relative to the laser input surface 124 (e.g., flat surface) upon which the pulsed laser beam 112 enters the axicon 122. Further, the laser output surface 126 terminates at a conical tip. Moreover, the aspheric optical element 120 includes a centerline axis 125 extending from the laser input surface 124 to the laser output surface 126 and terminating at the conical tip. In other embodiments, the aspheric optical element 120 may comprise a waxicon, a spatial phase modulator such as a spatial light modulator, or a diffractive optical grating. In operation, the aspheric optical element 120 shapes the incoming pulsed laser beam 112 (e.g., an incoming Gaussian beam) into a quasi-non-diffracting beam, which, in turn, is directed through the first lens 130 and the second lens 132.

Referring still to FIG. 2, the first lens 130 is positioned upstream of the second lens 132 and may collimate the pulsed laser beam 112 within a collimation space 134 between the first lens 130 and the second lens 132. The cross-sectional profile of the laser beam in this space 134 often takes on the form of an annulus or "ring" of light, such as in the case of the eventual formation of a Gauss-Bessel beam. Further, the second lens 132 may focus the pulsed laser beam 112 into the transparent workpiece 160, which may be positioned at an imaging plane 104. The action of the second lens 132 is to take the optical Fourier transform of the beam profile in the collimated space 134. The Fourier transform of an annulus is a Bessel function, which is why annular or "ring" shaped beams are typically the inputs used to form Bessel-like beams. Modifications to the specific intensity profile or phase of the annulus of light propagating in the collimated space 134 may be used to impart focused beam shapes that are different from that of an ideal Bessel function, such as creating more elliptical cores to the Bessel-like focus spot, or causing the focused core of the beam to curve, as in the case of generating an Airy beam. In some embodiments, the first lens 130 and the second lens 132 each comprise plano-convex lenses. When the first lens 130 and the second lens 132 each comprise plano-convex lenses, the curvature of the first lens 130 and the second lens 132 may each be oriented toward the collimation space 134. In other embodiments, the first lens 130 may comprise other collimating lenses and the second lens 132 may comprise a meniscus lens, an asphere, or another higher-order corrected focusing lens.

Referring again to FIGS. 1A-2, a method for forming the damage line 170 comprising defects includes directing (e.g., localizing) a pulsed laser beam 112 oriented along the beam pathway 111 and output by the beam source 110 into the transparent workpiece 160 such that the portion of the pulsed laser beam 112 directed into the transparent workpiece 160 generates an induced absorption within the transparent workpiece and the induced absorption produces a plurality of defects within the transparent workpiece 160. For example, the pulsed laser beam 112 may comprise a pulse energy and a pulse duration sufficient to exceed a damage threshold of the transparent workpiece 160. In some embodiments, directing the pulsed laser beam 112 into the transparent workpiece 160 comprises focusing the pulsed laser beam 112 output by the beam source 110 into the pulsed laser beam focal line 113 oriented along the beam propagation direction (e.g., the Z axis). The transparent workpiece 160 is positioned in the beam pathway 111 to at least partially overlap the pulsed laser beam focal line 113 of pulsed laser beam 112. The pulsed laser beam focal line 113 is thus directed into the transparent workpiece 160. The pulsed laser beam 112, e.g., the pulsed laser beam focal line 113 generates induced absorption within the transparent workpiece 160 to create the plurality of defect in the transparent workpiece 160, thereby forming the damage line. In some embodiments, individual defects may be created at rates of several hundred kilohertz (i.e., several hundred thousand defects per second).

In some embodiments, the aspheric optical element 120 may focus the pulsed laser beam 112 into the pulsed laser beam focal line 113. In operation, the position of the pulsed laser beam focal line 113 may be controlled by suitably positioning and/or aligning the pulsed laser beam 112 relative to the transparent workpiece 160 as well as by suitably selecting the parameters of the optical assembly 100. For example, the position of the pulsed laser beam focal line 113 may be controlled along the Z-axis and about the Z-axis. Further, the pulsed laser beam focal line 113 may have a length in a range of from about 0.1 mm to about 100 mm or in a range of from about 0.1 mm to about 10 mm. Various embodiments may be configured to have a pulsed laser beam focal line 113 with a length l of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm.

Referring still to FIGS. 1A-2, the method for processing the transparent workpiece 160 may include translating the transparent workpiece 160 relative to the pulsed laser beam 112 (or the pulsed laser beam 112 may be translated relative to the transparent workpiece 160, for example, in a translation direction to form a plurality of damage lines 170, also sometimes referred to as damage tracks. The plurality of damage lines may, in some embodiments, form a closed contour to trace out the desired perimeter of a feature that may be formed in the transparent workpiece 160 after a subsequent vapor etching step. The damage lines may penetrate the full depth of the glass. It should be understood that while sometimes described as "holes" or "hole-like," the defects and the damage lines formed therefrom disclosed herein may generally not be void spaces, but are rather portions of the transparent workpiece 160 which has been modified by laser processing as described herein to make the portions of the transparent workpiece 160 more susceptible to etching.

In some embodiments, the damage lines 170 may generally be spaced apart from one another by a distance of greater than about 10 μm. For example, suitable spacing between the damage lines 170 may be from about 10 μm to about 500 μm. It is contemplated that the distance between the damage lines 170 can be selected based on the particular semiconductor properties and requirements. In some other embodiments, such as embodiments in which the damage lines 170 are etched to result in the merging of etched features, the spacing or pitch between adjacent laser damage lines or sites 170 may be, for example, greater than or equal to 1 μm and less than or equal to 200 μm, greater than or equal to 5 μm and less than or equal to 50 μm, or even greater than or equal to 10 μm and less than or equal to 20 μm. Further, the translation of the transparent workpiece 160 relative to the pulsed laser beam 112 may be performed by moving the transparent workpiece 160 and/or the beam source 110 using one or more translation stages 190.

Figure 3:
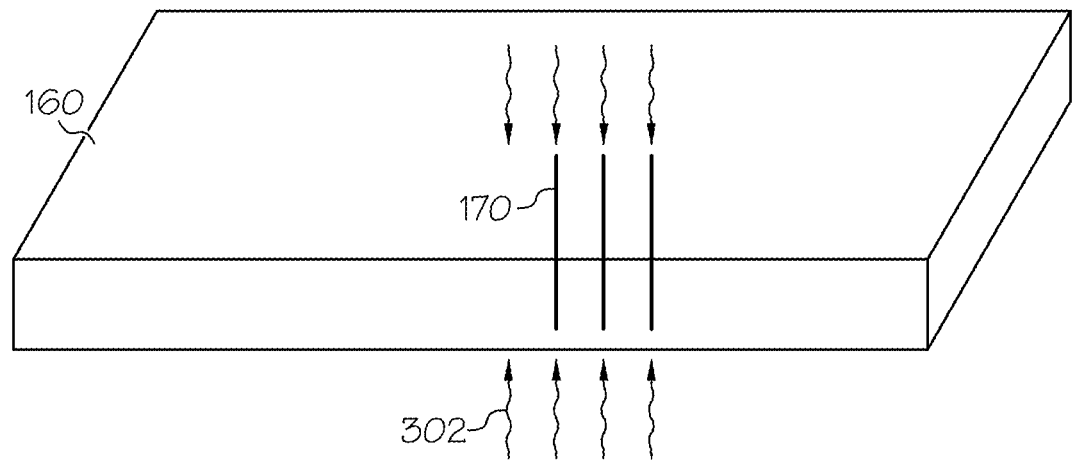
FIG. 3 schematically depicts vapor etching of a transparent workpiece having a plurality of damage lines according to one or more embodiments described herein.
Figure 4:
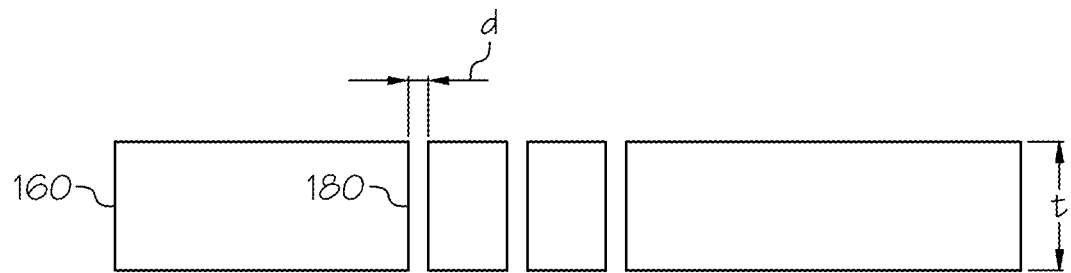
FIG. 4 is a cross-section of a transparent workpiece having a plurality of apertures formed therein according to one or more embodiments described herein.

Referring now to FIG. 3, following the formation of the damage line 170 in the transparent workpiece 160, the transparent workpiece 160 may be vapor etched along the damage line to form an aperture 180 extending through the transparent workpiece 160. For example, the transparent workpiece 160 may be vapor etched by exposing the transparent workpiece 160 to an etching vapor 302, at least along the damage line 170. In various embodiments, the transparent workpiece 160 may be exposed to the etching vapor in the absence of an etching mask, although, in some embodiments, an etching mask may be used. In other words, in various embodiments described herein, the apertures 180 may be formed through the transparent workpiece 160 by an etching process without the need for masking, but the use of a mask is not specifically excluded.

In various embodiments, the etching vapor 302 is a dry etching vapor, which can include an etchant, such as HF, in the form of a gas. The HF will react with silicon dioxide found in a glass substrate to form silicon tetrafluoride and water vapor. In some embodiments, an alcohol is also present, which serves to ionize the etching vapor and may act as a catalyst. Without being bound by theory, it is believed that the gaseous etchant can penetrate the damage line 170 more efficiently than wet chemical etching solutions. Additionally, it is believed that the penetration or diffusion of the etchant into the depth of the transparent workpiece 160 may be controlled to a rate faster than a reaction rate of the etching, which, in turn, may enable controlling the shape of the aperture. For example, in various embodiments, the etching vapor may diffuse into the transparent workpiece 160 at a rate that is much faster than the reaction rate of the etching, which can lead to the formation of more cylindrical apertures, as opposed to "hourglass" shaped apertures which are formed when the etching rate of the laser modified glass is greater near the surfaces of the substrate as compared to deep within the body of the glass. In other embodiments, the diffusion rate of the etching vapor into the laser modified glass may be particularly determined to achieve a particular waist opening.

As used herein, the term "cylindrical" means that an aperture, or "via", diameter varies by less than or equal to 30%, or less than or equal to 20% through the thickness of the transparent workpiece 160. The variation of the diameter of the via may be calculated by taking the difference between the largest measured diameter of the via and the smallest measured diameter of the via and dividing the result by the largest measured diameter of the via. In embodiments, the diameter is measured using an SEM cross-section of the via, or by using optical metrology of the via from the top/bottom side (e.g., to measure the top, bottom, waist). Unless otherwise specified, the diameter is measured using an SEM cross-section. As used herein, the term "waist" refers to the diameter of the via or aperture at its most narrow point, or the minimum diameter of the aperture.

In various embodiments, the vapor etching may be carried out at a pressure of from about 10 kilopascals (kPa) to about 20 kPa. It is contemplated that, in various embodiments, the pressure and temperature of the process, as well as the amount of etching vapor can be adjusted to control the diffusion rate of the etchant into the transparent workpiece 160. Commercially available vapor etching systems that are suitable for use include, by way of example and not limitation, those available under the trade name SPTS from Orbotech (Israel).

In general, the laser modified regions produced by quasi non-diffracting beams are very challenging for liquid phase etchant to penetrate and etch uniformly throughout the depth of the substrate. To fully open a via with liquid phase etching, that is, to have a clear open channel where glass has been removed all the way through the depth of the substrate, can require ~1 µm of via diameter growth of the via entrance/exit diameter for every 5 µm of etch penetration into the depth of the substrate. This means that achieving vias with aspect ratios of >10:1 can be challenging for liquid phase etching. Even if enough liquid phase etching is done to open the via, the via will frequently have an "hourglass" shape, where the via's waist diameter is much smaller than the top/bottom diameter of the via, such as <70% of the top/bottom diameter (i.e., >30% difference in diameter), or <50% of the top/bottom diameter (i.e., >50% difference in diameter), or <30% of the top/bottom diameter (i.e., >70% difference in diameter). Furthermore, assuming no mask is used to delineate the regions around the vias/laser damage, with liquid phase etching this means that to ensure the etchant has penetrated to the center thickness of the glass, significant surface removal (thinning) will also occur. For example, a via diameter growth to etch penetration depth ratio of 1:5 means with liquid phase etching, to form a through via in 300 µm thick glass, at least a 30 µm diameter hole must be formed, and hence at least 30 µm of surface removal (thinning) would need to be done. Employing a mask, such as a silicon oxy-nitride coating to allow the vias themselves to etch in liquid phase HF without surface thinning, leads to other via shape complications, such as etch undercutting of the mask at the edges of the vias.

Hence, vapor phase etch of quasi-non-diffracting beam laser modifications can help achieve significantly different and advantageous properties for via dimensions. After etching, various embodiments achieve an aspect ratio of the average thickness t of the transparent workpiece 160 (shown in FIG. 4) to the average diameter d of the apertures is greater than or equal to 20:1. For example, the aspect ratio may be greater than or equal to 30:1, greater than or equal to 40:1, or even greater than or equal to 50:1. In some embodiments, the aspect ratio is less than or equal to 55:1. Moreover, the apertures extending through the glass substrate generally have an average diameter of greater than or equal to 5 µm and less than or equal to 50 µm, less than or equal to 20 µm, less than or equal to 15 µm, or even less than or equal to 10 µm. Although apertures with larger diameters are contemplated, it should be understood that, in various embodiments, the reaction rate for the etching of the transparent workpiece can limit the process time and hence the economic feasibility.

In some embodiments, the transparent workpiece may be wet etched to further increase the diameter of the apertures. For example, the transparent workpiece 160 may be wet etched by applying a wet chemical etching solution comprising a chemical etchant to the transparent workpiece 160. The wet chemical etching solution may be, for example, sprayed onto the transparent workpiece, or the transparent workpiece may be immersed in a bath containing the chemical etching solution. When wet etching is used to increase the diameters of the one or more apertures 180 extending through the transparent workpiece 160, it may be desirable to minimize the amount of material removed from the surfaces of the transparent workpiece 160 (i.e. minimizing thickness removal) and to maximize the uniformity of material removal through the depth of each aperture 180. This may be achieved by minimizing the etching rate, as described in more detail below.

The apertures 180 provide a pathway for the wet etching solution to penetrate into the depth of the transparent workpiece 160 and remove material of the transparent workpiece 160 within and surrounding the apertures 180, increasing the diameter of the via. In some embodiments, the wet etching solution may remove material of the transparent workpiece 160 between adjacent apertures 180 along a closed contour line, thereby separating the material of the transparent workpiece 160 within the closed contour line from the rest of the transparent workpiece 160 to form a feature.

Figure 6:
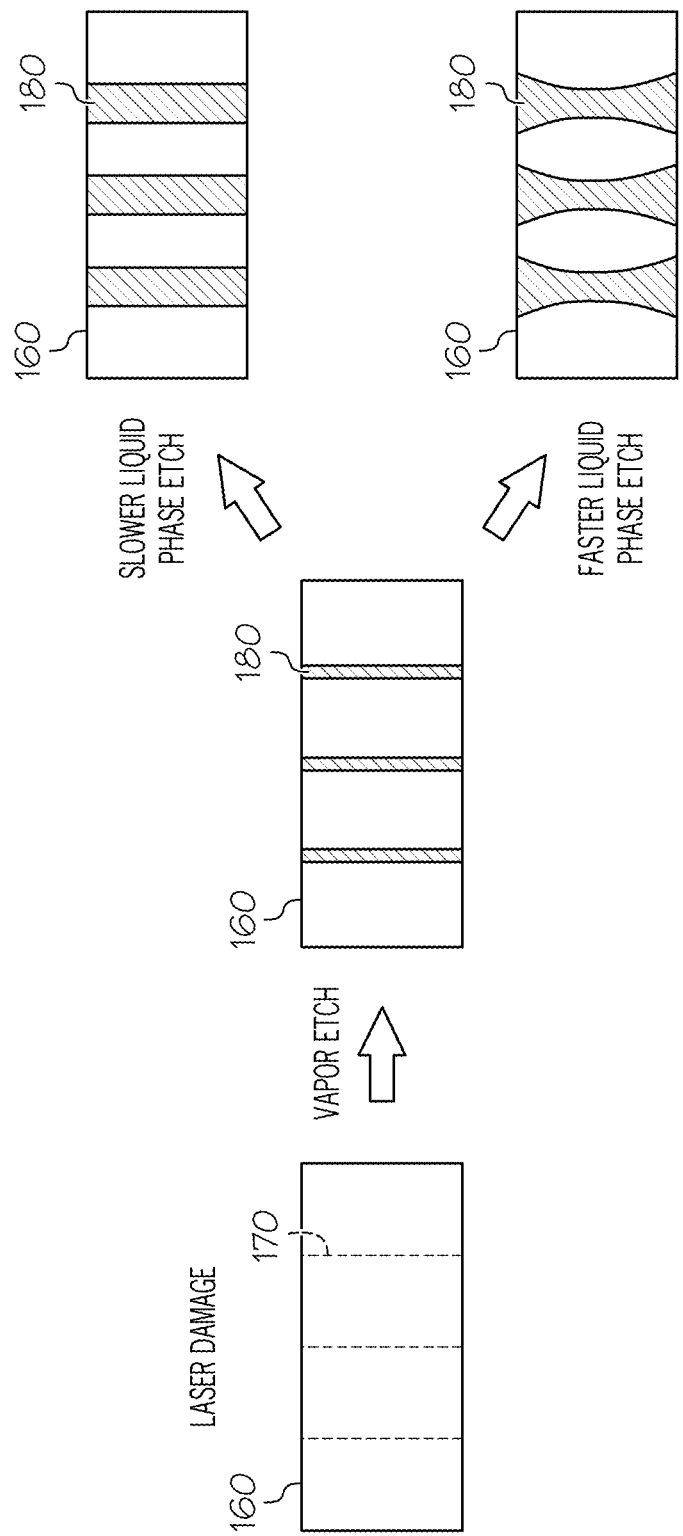
FIG. 6 schematically depicts a method of forming vias in a transparent workpiece according to one or more embodiments described herein.

While not intending to be limited by theory, wet etching the apertures 180 may cause the formation of an hourglass shaped profile in which a diameter of the aperture 180 at the major surfaces of the transparent workpiece 160 is greater than a waist diameter within the depth of the aperture, (e.g., about halfway between each major surface of the transparent workpiece 160), as shown in FIG. 6. As used herein, "major surfaces" refers to the imaging surface 162 of the transparent workpiece 160 and the surface opposite the imaging surface 162 (e.g., the back surface). This hourglass shaped profile is caused by the initial restriction of the chemical etching solution traversing the depth of the aperture 180 (i.e., diffusing through the depth of the aperture 180). Thus, the portions of the apertures 180 at and near the major surfaces will immediately undergo etching when the chemical etching solution contacts the transparent workpiece 160; while portions of the aperture 180 within the transparent workpiece 160 will not undergo etching until the chemical etching solution diffuses through the depth of the apertures 180 (i.e., diffuses from each major surface to the waist of the aperture 180).

In embodiments in which both vapor etching and wet chemical etching processes are used, the particular shape of the aperture 180 can be controlled by adjusting the amount of etching performed by each process. For example, for more cylindrical apertures, vapor etching may first be performed for a greater amount of time and then wet chemical etching may be performed for a lesser amount of time as compared to processing methods for achieving more hourglass-shaped apertures. Additionally or alternatively, the etching rate of one or both etching processes may be adjusted to adjust the shape of the apertures 180.

In embodiments, during wet chemical etching, the diameter of the aperture 180 at the major surfaces may be larger than the waist diameter of the aperture 180. Further, once the wet chemical etching solution traverses the aperture 180 (i.e. reaches the waist/center of the aperture 180), the difference between the surface diameters and the waist diameter of each aperture 180 will remain constant thereafter. Thus, minimizing the etching rate will minimize the thickness loss of material of the transparent workpiece 160 and the minimize the difference between the surface diameter and the waist diameter of the apertures 180 because minimizing the etching rate minimizes the amount of material of the transparent workpiece 160 removed before the wet chemical etching solution extends through the depth of the transparent workpiece 160. In other words, minimizing the etching rate will maximize the uniformity of material removal through the depth of each aperture 180 such that the difference between the diameter of the aperture 180 at the major surfaces and the waist diameter of the aperture 180 is minimized. Moreover, increasing the uniformity of the aperture 180 results in more uniform walls of the aperture 180 (i.e., aperture walls that are nearly or fully orthogonal to the major surfaces of the transparent workpiece 160).

While not intending to be limited by theory, the etching rate is a controllable variable of the Thiele modulus ($\phi$) of a chemical etching process, which mathematically represents a ratio of etching rate to diffusion rate, as described in Thiele, E. W. *Relation between catalytic activity and size of particle*, Industrial and Engineering Chemistry, 31 (1939), pp. 916-920. When the etching rate is greater than the diffusion time, the Thiele modulus will be greater than 1. This means that the initial wet chemical etching solution introduced into the aperture 180 will be depleted before it reaches the waist (e.g., center) of the aperture 180 where it can be replenished by diffusion of additional chemical etchant from the portion of the aperture 180 at the opposite surface of the transparent workpiece 160. As a result, wet chemical etching will begin earlier at the top and bottom of the aperture 180 than at the center (e.g., waist), leading to an hourglass-like shape formed from the aperture 180. However, if the diffusion time is equal to or greater than the etching rate, then the Thiele modulus will be less than or equal to 1. Under such conditions, the chemical etchant concentration will be uniform along the entire aperture 180 and the aperture 180 will be etched uniformly, yielding a substantially cylindrical void along each aperture 180.

As described herein, the etching rate can be controlled to control the Thiele modulus of the wet chemical etching process, and thereby control the ratio of the expansion of the waist diameter of the void formed along the aperture 180 to ratio of expansion of the diameters of the top and bottom openings of the void formed from the aperture 180. Further, in some embodiments, the Thiele modulus for the chemical etching process described herein can be less than or equal to about 5, less than or equal to about 4.5, less than or equal to about 4, less than or equal to about 3.5, less than or equal to about 3, less than or equal to about 2.5, less than or equal to about 2, less than or equal to about 1.5, or less than or equal to about 1.

The etching rate may be decreased by lowering the concentration of chemical etchant of the wet chemical etching solution, lowering the temperature of the wet chemical etching solution, agitating the wet chemical etching solution during etching, for example, using ultrasonics, physical motion, or the like. Further, the etching rate may be affected by the composition of the transparent workpiece 160.

FIG. 6 schematically depicts an example method in which the transparent workpiece 160 is laser modified to create a plurality of damage lines 170 extending through the transparent workpiece 160 and then vapor etched to create apertures 180. After the formation of the apertures 180, wet chemical etching solutions can be used to wet etch the vias, or apertures, to a particular shape. As shown in FIG. 6, a slower wet etch can be used to create apertures 180 having a more cylindrical shape, while a faster wet etch can be used to create apertures 180 having a smaller waist.

In various embodiments, the wet chemical etching solution may be an aqueous solution that includes the chemical etchant and deionized water. In some embodiments, the chemical etchant may comprise a primary acid and a secondary acid. The primary acid can be hydrofluoric acid and the secondary acid can be nitric acid, hydrochloric acid, or sulfuric acid. In some embodiments, the chemical etchant may only include a primary acid. In some embodiments, the chemical etchant may include a primary acid other than hydrofluoric acid and/or a secondary acid other than nitric acid, hydrochloric acid, or sulfuric acid. For example, in some embodiments, the primary acid chemical etchant may comprise from about 1% by volume hydrofluoric acid to about 15% by volume hydrofluoric acid, for example, about 2.5% by volume hydrofluoric acid to about 10% by volume hydrofluoric acid, 2.5% by volume hydrofluoric acid to about 5% by volume hydrofluoric acid, and all ranges and subranges in between. Further, in some embodiments, the secondary acid may comprise may comprise from about 1% by volume hydrofluoric acid to about 20% by volume nitric acid, for example, about 2.5% by volume nitric acid to about 15% by volume nitric acid, 2.5% by volume nitric acid to about 10% by volume nitric acid, 2.5% by volume nitric acid to about 5% by volume nitric acid and all ranges and subranges in between. As additional examples, chemical etchants can include 10% by volume hydrofluoric acid/15% by volume nitric acid, 5% by volume hydrofluoric acid/7.5% by volume nitric acid, 2.5% by volume hydrofluoric acid/3.75% by volume nitric acid, 5% by volume hydrofluoric acid/2.5% by volume nitric acid, 2.5% by volume hydrofluoric acid/5% by volume nitric acid or the like. Further, lowering the concentration of chemical etchant in the chemical etching solution may lower the etching rate. Thus, it may be advantageous to use a minimum effective concertation of chemical etchant in the chemical etching solution.

In various cases, wet chemical etching solution may be a hydroxide solution, such as NaOH or KOH. An exemplary solution for etching of vias in high purity fused silica or other glasses is 12M NaOH at 195° F. (approximately 90° C.).

In some embodiments, the wet chemical etching solution may be agitated when the transparent workpiece 160 is positioned within the chemical etching bath. For example, the chemical etching solution may be mechanically agitated, ultrasonically agitated, or combinations thereof. Agitation may increase the diffusion rate of the chemical etching solution through the depth of the apertures 180, thereby facilitating faster separation while limiting material removal and facilitating uniformly shaped apertures. In some embodiments, the chemical etching bath may be mechanically agitated in the X, Y, and Z directions to improve uniform etching of the apertures 180. The mechanical agitation in the X, Y, and Z directions may be continuous or variable. In some embodiments, the chemical etching bath may comprise one or more ultrasonic transducers configured to generate ultrasonic agitation of the chemical etching solution within the chemical etching bath. For example, the ultrasonic transducers may be located at the bottom of the chemical etching bath or one or more sides of the chemical etching bath.

Without being bound by theory, it is believed that the application of ultrasonic agitation to the chemical etching bath before the apertures 180 are opened through the entire depth of the transparent workpiece 160 can result in the formation of large voids within the apertures 180. However, if the aperture 180 is open from the first major surface of the transparent workpiece to the second major surface of the transparent workpiece, ultrasonic agitation may be applied without forming such voids. Accordingly, in various embodiments, formation of the open aperture via vapor etching enables ultrasonic agitation to be employed from the beginning of the wet chemical etching process, thereby reducing the likelihood of generating voids within the apertures.

Moreover, as described above, in various embodiments, a plurality of damage lines can be used to form a closed contour line. When the diameters of apertures formed from the etching of the plurality of damage lines are increased, the material between adjacent apertures may be removed, causing separation of a portion of the transparent workpiece along the closed contour line. For example, as shown in FIG. 5, a closed contour line 570 extends along a closed contour 565, which delineates a line of intended separation along which one or more features may be formed in the transparent workpiece 160. The closed contour line 570 comprises a plurality of damage lines 170 that extend into the surface of the transparent workpiece 160 and establish a path for the separation of material of the transparent workpiece 160 enclosed by the contour line 570 from the remaining transparent workpiece 160 thereby forming a feature extending through the transparent workpiece 160, for example, by applying a vapor etchant to the transparent workpiece 160, along the closed contour line 570. Upon the merging of adjacent apertures to separate the portion of the transparent workpiece, an edge is formed that is comprised of the series of apertures. In some such embodiments, the edge (or at least a portion thereof) includes partial apertures that were merged. In other words, the edge may not be smooth, but may instead include a plurality of notches or indentations that previously formed the apertures.

Additional details on forming closed contour lines, as well as using closed contour lines to form features in the transparent workpiece, may be found in U.S. patent application Ser. No. 16/162,644, filed on Oct. 17, 2018, the entire contents of which is hereby incorporated by reference.

The morphology of the resulting part edge will be a combination of any damage caused by the laser, such as microcracks, and etched features, such as vias that have merged together to allow the interior contour to separate from the rest of the workpiece. Typically, there is a balance between imparting enough laser modification to the material to enable rapid penetration of liquid etchant and trying to minimize any laser-caused microcracking, so as to create a smooth or strong edge. If the laser modification is weak, microcracks are minimized, but etchant penetration is made slower and less effective. Thus, with liquid phase etched parts, the edge generally takes on a textured appearance that is dominated by etched microcracks. Such features will create an "orange peel" like texture to the edge of the glass. However, with vapor phase etching, even modest material modifications can be etched well by the vapor, meaning that the resulting part edge will be smoother, dominated by cylindrical shaped features of the individual laser modifications merging together.

EXAMPLES

The following examples illustrate one or more features of the embodiments described herein.

Figure 7A:
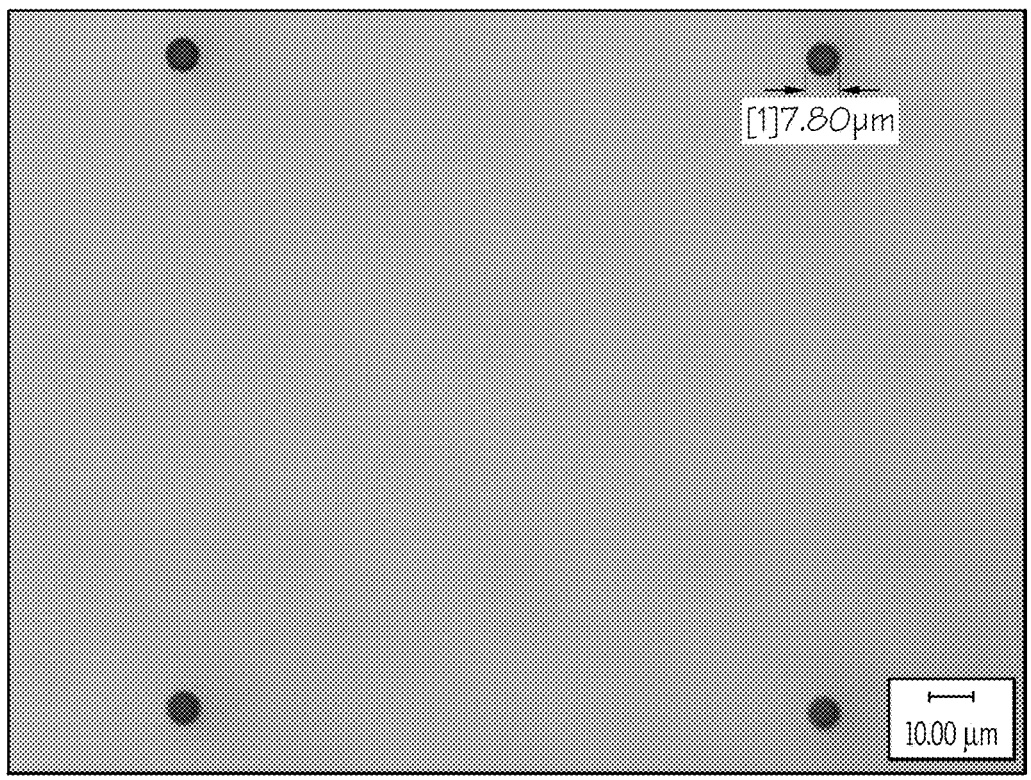
FIG. 7A is a top view of a 350 μm thick high purity fused silica substrate that was exposed to a QNDB laser and vapor etched for 27 minutes.
Figure 7B:
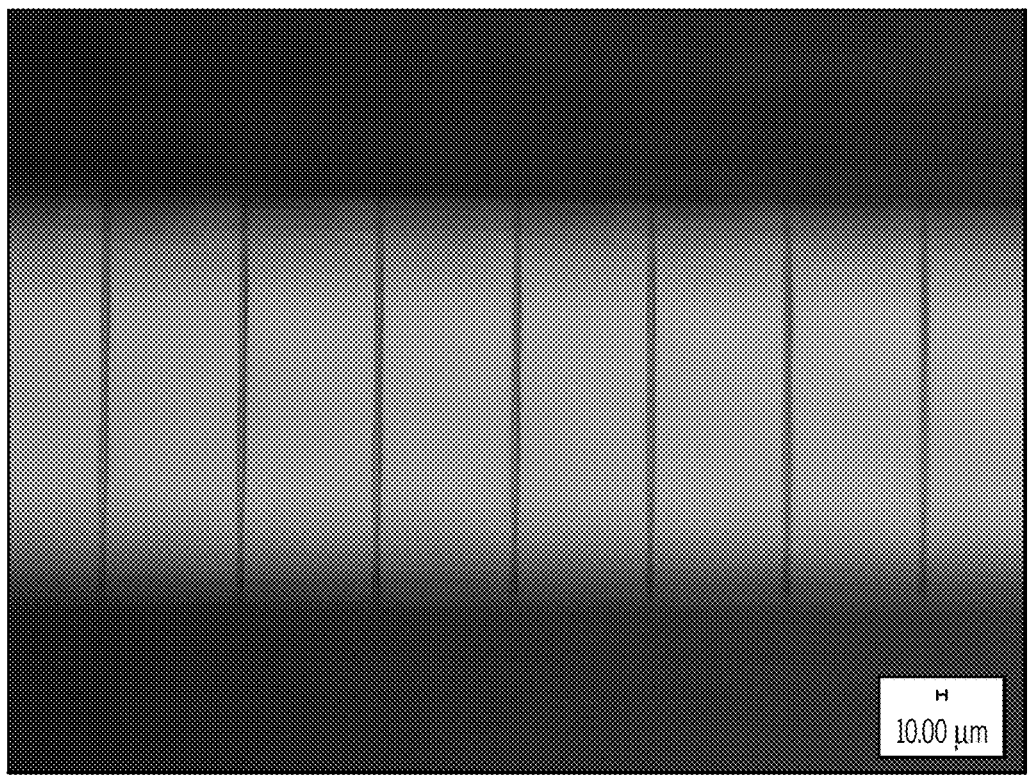
FIG. 7B is a cross-sectional view corresponding to the example depicted in FIG. 7A.
Figure 7C:
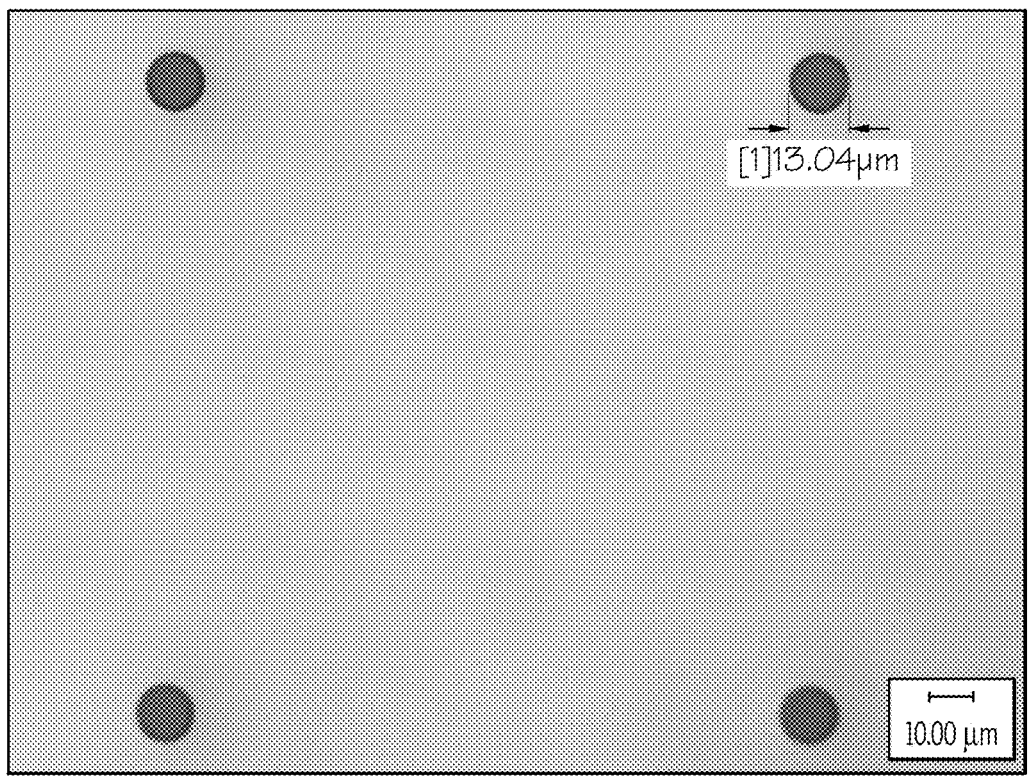
FIG. 7C is a top view of a 350 μm thick high purity fused silica substrate that was exposed to a QNDB laser and vapor etched for 54 minutes.
Figure 7D:
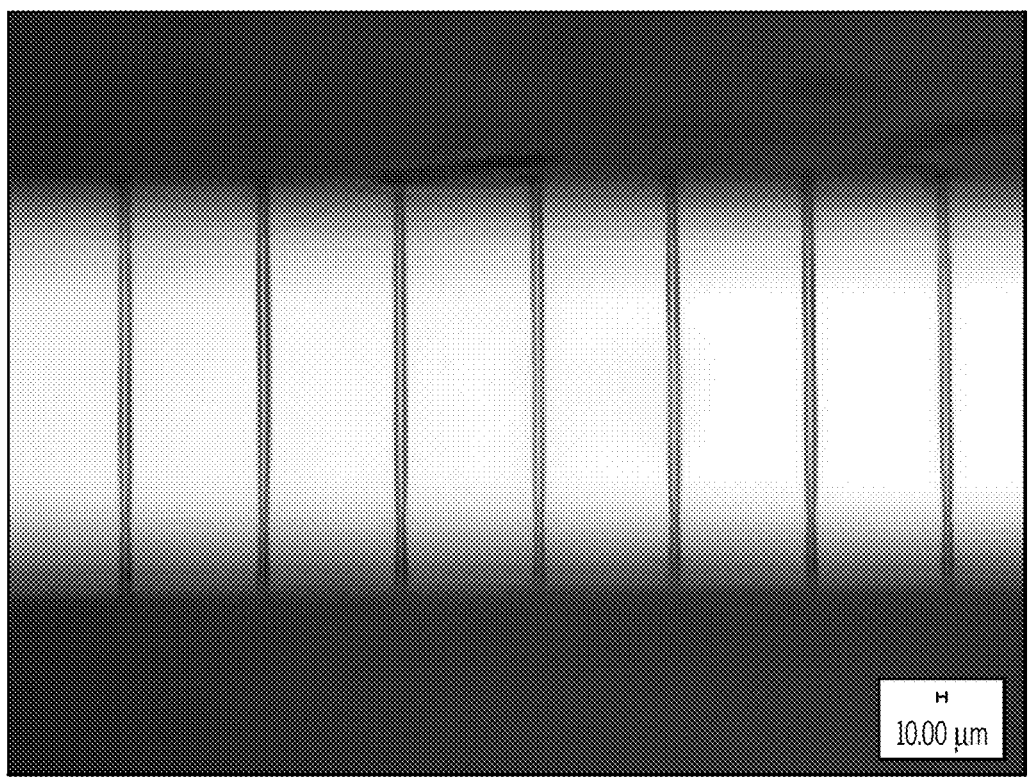
FIG. 7D is a cross-sectional view corresponding to the example depicted in FIG. 7C.
Figure 7E:
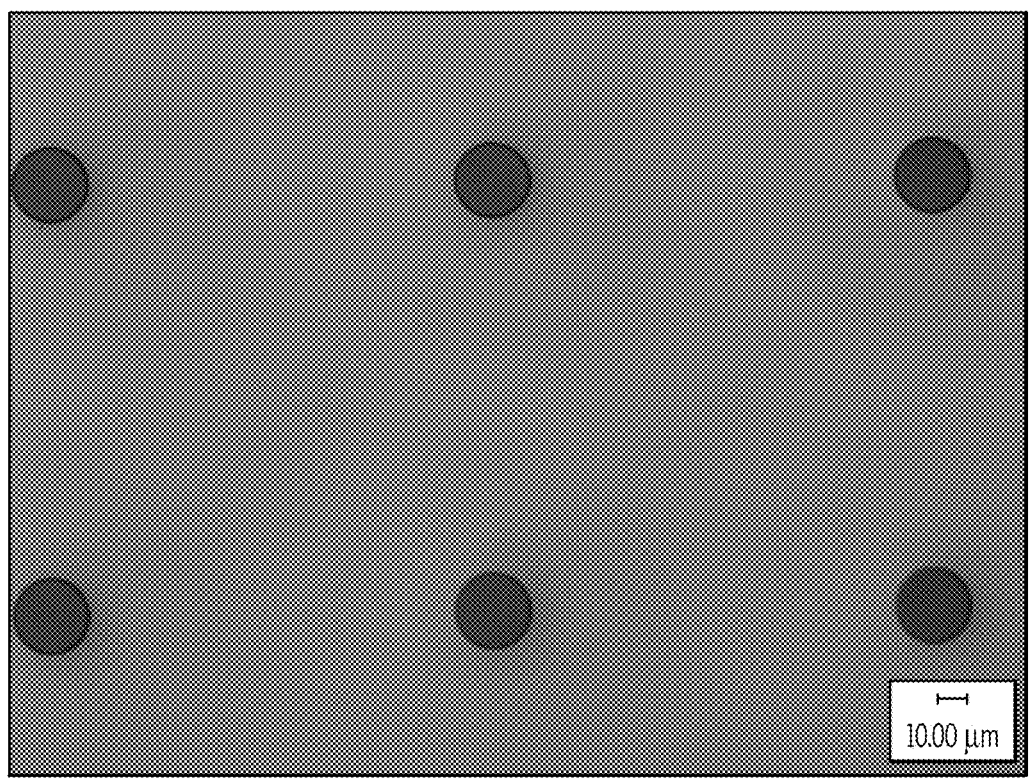
FIG. 7E is a top view of a 350 μm thick high purity fused silica substrate that was exposed to a QNDB laser and vapor etched for 108 minutes.
Figure 7F:
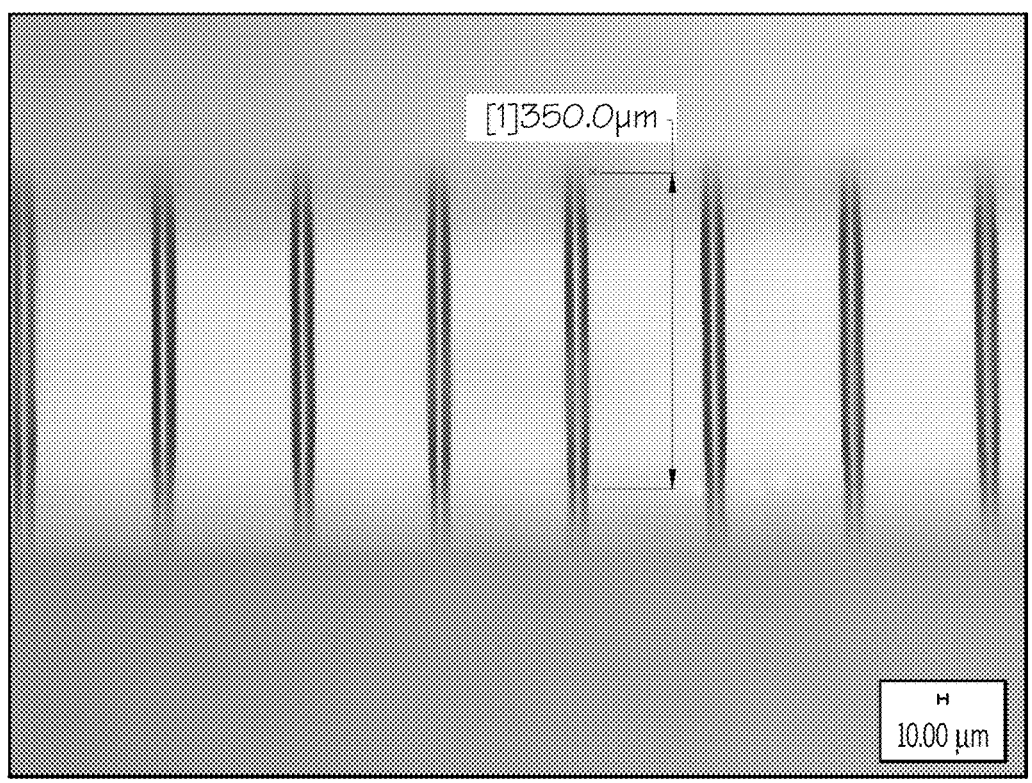
FIG. 7F is a cross-sectional view corresponding to the example depicted in FIG. 7E.

High purity fused silica samples having a thickness of 350 μm were exposed to a QNDB laser and vapor etched to form vias through the thickness of the samples. FIGS. 7A-7F show the result of QNDB laser exposure and vapor etching. The laser exposure of each via site was performed using a Gauss-Bessel beam with a 532 nm wavelength, an ~0.7 mm focal line length, a diameter of ~1.2 microns, a burst energy of 80 μj/burst, and 15 pulses/burst. Following laser exposure, the parts were vapor etched using a combination of anhydrous HF and ethanol vapor at an etch rate of ~0.23 μm/minute. The images show the post-etch entrance diameter of the vias (FIGS. 7A, 7C, and 7E), as well as cross-sectional profiles of the open via track (FIGS. 7B, 7D, and 7F). In these images, the dark areas indicate the openings in the glass where material has been removed. In particular, FIGS. 7A and 7B show vias of 8 micron diameter after 27 minutes of etch exposure, FIGS. 7C and 7D show vias of 13 μm diameter after 54 minutes of etch exposure, and FIGS. 7E and 7F show vias of 27 μm diameter after 108 minutes of etch exposure. In all cases, the cross-sectional profiles (FIGS. 7B, 7D, and 7F) of the vias show negligible taper in the via diameter <<20% of the via top diameter, and, specifically, <5% of the via top diameter. The 8 μm vias in 350 μm thick glass correspond to an aspect ratio of ~350/8=44:1, with <1 μm of diameter taper between the top of the via and the middle of the glass (within the ability to accurately measure), which represents <13% diameter variation through the via depth.

Figure 8:
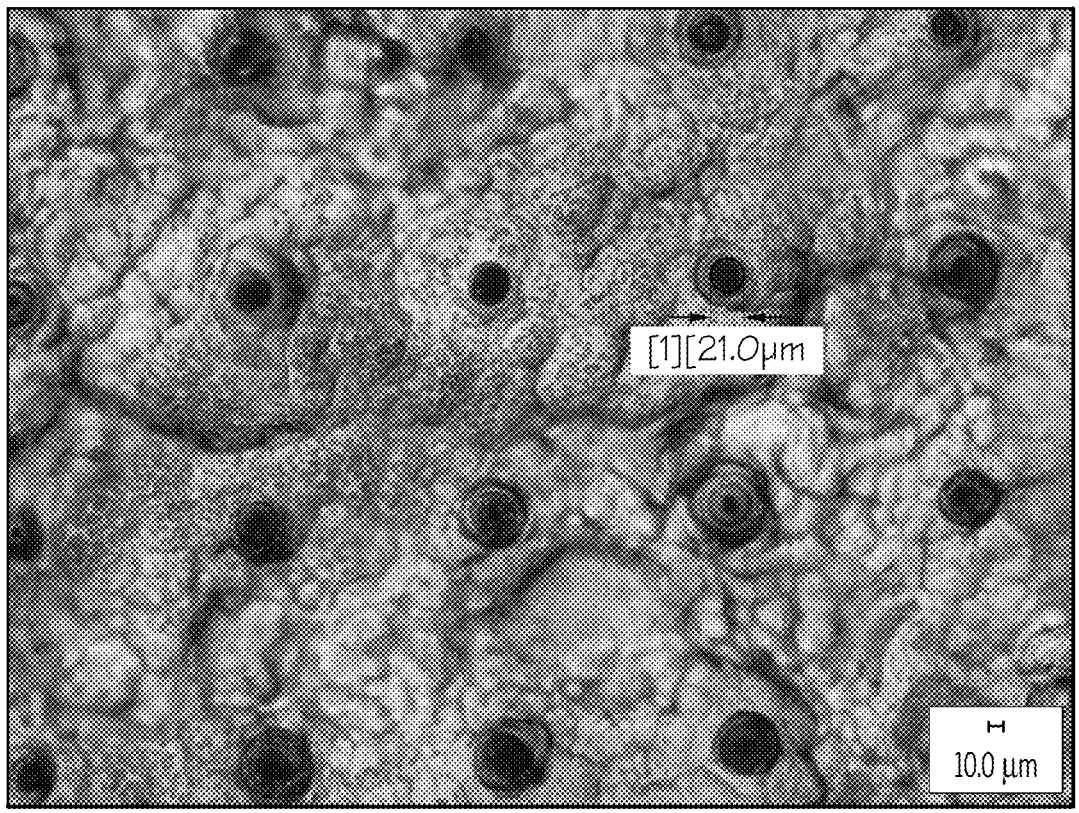
FIG. 8 is a top view of a 400 μm thick aluminosilicate glass substrate that was exposed to a QNDB laser and vapor etched for 27 minutes.

In contrast, FIG. 8 shows the results of the same QNDB laser exposure and 27 minutes of vapor etching to attempt to create vias in 400 µm thick Eagle XG, an aluminosilicate glass. In this case, small opening are present at the laser damage sites in the glass, but the vias are not etched open. Additionally, a significant surface texture is present, representing a "crust" on the part. In this case, the HF vapor has reacted with the aluminosilicate glass, and begun the etching process, but there are significant by-products formed that are insoluble in HF vapor (non-volatile), and a crust is formed which both cause the surface texture as well as block penetration of the HF vapor from continuing to etch the laser modification in the body of the glass, so no through opening is formed at the site of the laser modification. This illustrates that the choice of glass has a substantial impact on the ability to vapor etch a laser-exposed via site, and that by-product formation is critical. In the case of EXG glass, the composition contains a substantial fraction of $Al_2O_3$, CaO, MgO, SrO, and SrO, constituting >20% of the glass composition by molar percentage. Accordingly, there are a number of elements in EXG glass that, when reacting with HF, will form non-volatile compounds that build up on the reacting glass surface and prevent further etching.

However, the $SiO_2$ in glass will form a volatile compound during HF vapor etch, which is why the high purity fused silica (100% $SiO_2$) continued to etch and resulted in open vias. Additionally, the $B_2O_3$ present in a substantial fraction in many glass compositions, such as borosilicate glasses, will also form a volatile compound—orthoboric acid. Hence, both high silica content glasses (defined here as glasses containing >95% $SiO_2$ by mol %) and borosilicate glasses (defined herein as glasses containing primarily silicon dioxide ($SiO_2$) and boric oxide ($B_2O_3$) by mol %, with less than 10% other constituents) are expected to vapor etch to form vias successfully.

In view of the foregoing description, it should be understood that formation of apertures having small diameters and high aspect ratios may be formed by vapor etching damage lines formed using pulsed laser beam focal lines. Further, it should be understood that wet etching techniques may be used after vapor etching to rapidly increase the diameter of the apertures.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for processing a transparent workpiece, the method comprising:
    directing a pulsed laser beam through an optical system and into the transparent workpiece such that a portion of the pulsed laser beam directed into the transparent workpiece generates an induced absorption within the transparent workpiece, the induced absorption producing a plurality of defects within the transparent workpiece thereby forming a damage line in the transparent workpiece that extends from a first surface of the transparent workpiece through at least a portion of a thickness of the transparent workpiece, the portion of the pulsed laser beam directed into the transparent workpiece comprising:
    a wavelength $\lambda$;
    a spot size $w_0$; and
    a Raleigh range $Z_R$ that is greater than $$F_D \frac{\pi w_o^2}{\lambda},$$

where $F_D$ is a dimensionless divergence factor comprising a value of 10 or greater; and
    etching the transparent workpiece with an etching vapor to remove at least a portion of the transparent workpiece along the damage line, thereby forming an aperture extending through the at least a portion of the thickness of the transparent workpiece.

2. The method according to claim 1, wherein the aperture comprises an aperture diameter and the aperture diameter varies by less than or equal to 30% through the thickness of the transparent workpiece.

3. The method according to claim 2, wherein the aperture diameter is less than about 20 µm.

4. The method according to claim 2, wherein an aspect ratio of an average thickness of the transparent workpiece to an average diameter of the plurality of apertures is greater than or equal to 20:1.

5. The method according to claim 2, further comprising etching the transparent workpiece with a wet chemical etching solution to further increase the aperture diameter.

6. The method according to claim 5, further comprising applying ultrasound to the wet chemical etching solution during the etching.

7. The method according to claim 1, wherein the etching vapor comprises a dry HF vapor.

8. A method for processing a transparent workpiece, the method comprising:
directing a pulsed laser beam through an optical system and into the transparent workpiece such that a portion of the pulsed laser beam directed into the transparent workpiece generates an induced absorption within the transparent workpiece, the induced absorption producing a void-free defect within the transparent workpiece, the portion of the pulsed laser beam directed into the transparent workpiece comprising:
a wavelength $\lambda$;
a spot size $w_0$; and
a Raleigh range $Z_R$ that is greater than $$F_D \frac{\pi w_o^2}{\lambda},$$

where $F_D$ is a dimensionless divergence factor comprising a value of 10 or greater; and
translating the transparent workpiece and the pulsed laser beam relative to each other thereby forming a plurality of damage lines extending from a first surface of the transparent workpiece to a second surface of the transparent workpiece through a thickness of the transparent workpiece; and
etching the transparent workpiece with an etching vapor to remove at least a portion of the transparent workpiece along each of the plurality of damage lines, thereby forming a plurality of apertures extending through the transparent workpiece, wherein each of the plurality of apertures has an average diameter of less than 20 μm and a taper of less than 30% along a length of each of the plurality of apertures through the thickness of the transparent workpiece.

9. The method according to claim 8, wherein an aspect ratio of the thickness of the transparent workpiece to the average diameter of the plurality of apertures is greater than or equal to 20:1 and less than or equal to 55:1.

10. The method according to claim 8, wherein the transparent workpiece comprises high purity fused silica, borosilicate glass, or a silica content of greater than or equal to 95 mol %.

11. The method according to claim 8, wherein the etching the transparent workpiece is performed in the absence of an etching mask.

12. The method according to claim 8, further comprising etching the transparent workpiece with a wet chemical etching solution to increase the average diameter of each of the plurality of apertures.

13. The method according to claim 12, further comprising applying ultrasound to the wet chemical etching solution during the etching.

* * * * *

UNITED STATES PATENT AND TRADEMARK OFFICE
CERTIFICATE OF CORRECTION

PATENT NO. : 11,052,481 B2  
APPLICATION NO. : 16/776055  
DATED : July 6, 2021  
INVENTOR(S) : Heather Debra Boek et al.

Page 1 of 1

It is certified that error appears in the above-identified patent and that said Letters Patent is hereby corrected as shown below:

On the Title Page

On page 2, in Column 1, item (56), Other Publications, Line 2, delete "Sacrifical" and insert -- Sacrificial --, therefor.

On page 2, in Column 1, item (56), Other Publications, Line 4, delete "Enbineering" and insert -- Engineering --, therefor.

On page 2, in Column 1, item (56), Other Publications, Line 4, delete "(1939." and insert -- (1939). --, therefor.

On page 2, in Column 1, item (56), Other Publications, Line 7, delete "(2012." and insert -- (2012). --, therefor.

On page 2, in Column 1, item (56), Other Publications, Line 10, delete "(2010." and insert -- (2010). --, therefor.

In the Claims

In Column 22, Line 37, Claim 1, delete "Raleigh" and insert -- Rayleigh --, therefor.

In Column 23, Line 13, Claim 8, delete "Raleigh" and insert -- Rayleigh --, therefor.

Signed and Sealed this  
Twenty-sixth Day of December, 2023

Katherine Kelly Vidal  
*Director of the United States Patent and Trademark Office*